(12) United States Patent
Tominaga et al.

(10) Patent No.: US 7,998,614 B2
(45) Date of Patent: Aug. 16, 2011

(54) LITHIUM ION RECHARGEABLE CELL

(75) Inventors: Yuki Tominaga, Okazaki (JP); Takaya Miyashita, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 556 days.

(21) Appl. No.: 12/095,708

(22) PCT Filed: Nov. 28, 2006

(86) PCT No.: PCT/JP2006/323737
§ 371 (c)(1),
(2), (4) Date: May 30, 2008

(87) PCT Pub. No.: WO2007/063857
PCT Pub. Date: Jun. 7, 2007

(65) Prior Publication Data
US 2010/0227216 A1     Sep. 9, 2010

(30) Foreign Application Priority Data

Dec. 2, 2005   (JP) ................................. 2005-349142

(51) Int. Cl.
*H01M 2/08*     (2006.01)

(52) U.S. Cl. ........................................................ 429/185
(58) Field of Classification Search .................... 429/185
See application file for complete search history.

(56) References Cited

FOREIGN PATENT DOCUMENTS

| JP | 2000-268877 A | | 9/2000 |
| JP | 2004-103415 | * | 4/2004 |
| JP | 2004-103415 A | | 4/2004 |

* cited by examiner

*Primary Examiner* — Jennifer K. Michener
*Assistant Examiner* — Carlos Barcena
(74) *Attorney, Agent, or Firm* — Birch, Stewart, Kolasch & Birch, LLP

(57) ABSTRACT

A lithium ion rechargeable cell that is constructed by the steps of forming a cell unit (1) by packing an electrode group (10), in which plate-like positive and negative electrodes (12 and 14) and a plate-like separator (16) are superposed in layers, in a cell case (20) and sealing the electrode group together with an electrolyte; and forming a module by aligning and packing a plurality of cell units in a module case. The cell case is made of a laminated film (22). A porous spacer (30) made of insulating material is interposed in between the entire circumferential surface or partial surface of the electrode group and the laminated film.

10 Claims, 3 Drawing Sheets

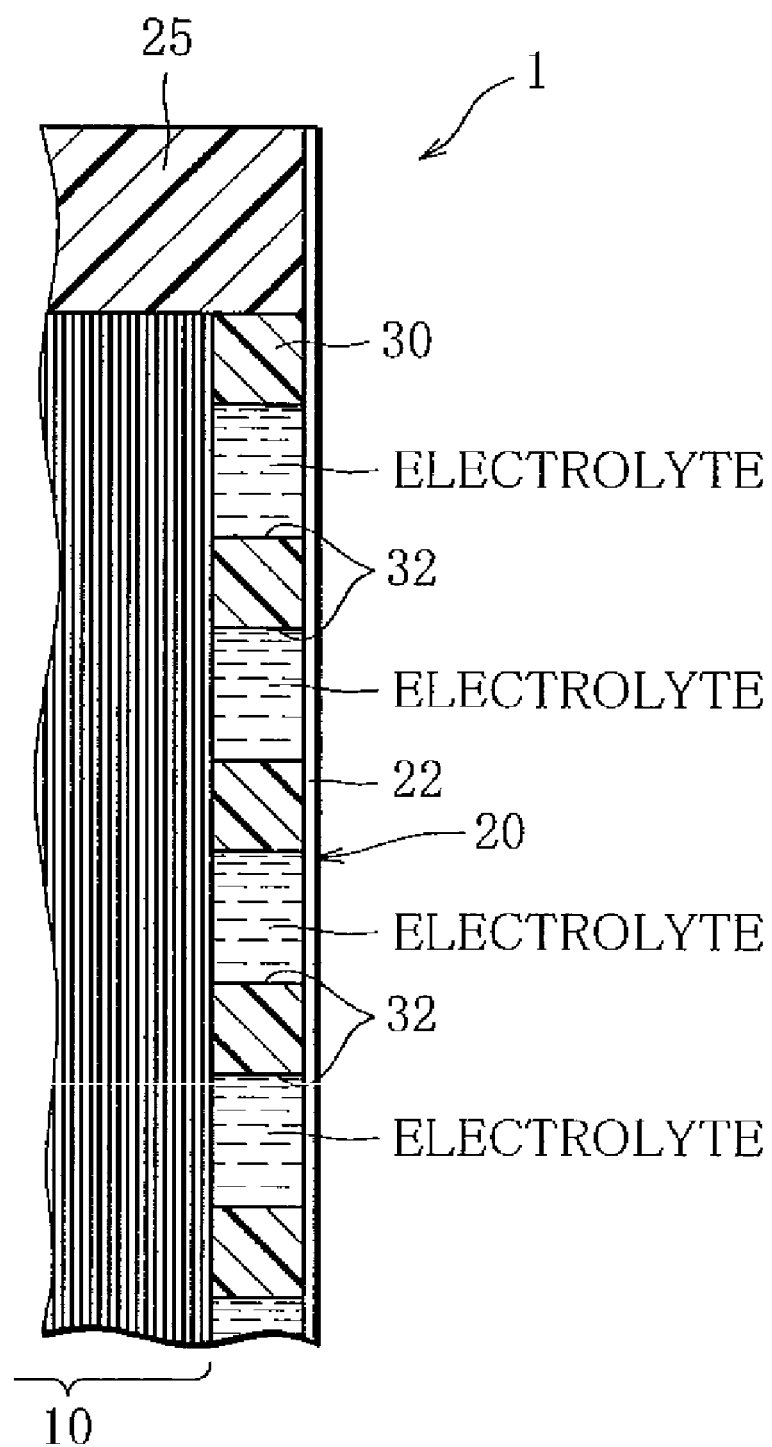

LITHIUM ION RECHARGEABLE CELL

BACKGROUND OF THE INVENTION

1. Field of the Invention

The present invention relates to a lithium ion rechargeable cell, and more specifically, to a cell case of a lithium ion rechargeable cell.

2. Description of the Related Art

In general, a lithium ion rechargeable cell is modularized. One module is constructed in the following manner. First, an electrode group, in which plate-like positive and negative electrodes and a plate-like separator are alternately superposed in layers, is packed in a cell case and sealed together with an electrolyte. The result is a cell unit. Several cell units are aligned and packed in a module case to produce a module.

A cell case and a module case have been generally fabricated with an undeformable rigid case that is made of, for example, resin or metal.

Therefore the capacity of the module case made with a rigid case is previously determined, so that the total cubic volume of the cell units contained in the module case is also previously determined.

If the cell case is made with a rigid case similarly to the module case as in the past, the relatively thick walls of the cell case limit the number of electrode plates that can be packed in the cell case. The capacity of the cell case is accordingly limited, too.

In order to enhance the workability of packing an electrode group in the cell case, an extra space is needed in the cell case. If the cell case is fabricated with an undeformable rigid case, it is difficult to make an efficient extra space, and the containing capacity is also limited.

Since the cell case fabricated with a rigid case is limited in capacity, it is difficult to achieve a compact and high-capacity lithium-ion rechargeable cell module.

If the capacity of each cell case is increased, the total cubic volume of wall thickness of the cell cases is reduced as a whole. On the other hand, as a result of increase of the cubic volume of each cell case, the number of cell cases that can be packed in a module case is decreased. This causes another problem that voltage is reduced unless electrode plates, an electrolyte and others are changed.

In light of the above problems, a lithium ion rechargeable cell has been contrived. This lithium ion rechargeable cell uses a wrap-type pouch case as a cell case, and contains an electrode group that is wrapped in a laminated film and depressurized so that the electrode group and the laminated film are firmly adhered together (Unexamined Japanese Patent Publication No. 2004-103415).

If the cell case is made with a wrap-type pouch case as described, it is possible to reduce the wall thickness of the cell case and smoothly pack the electrode group in the cell case without extra space. The lithium ion rechargeable cell can be configured without a change in outer size of the cell case. At least the module case fabricated with a rigid case is quite capable of absorbing external impacts.

On the other hand, if the electrode group is simply covered with a laminated film as described above, an adhesion degree between the laminated film and the electrode group is high. Due to the high adhesion degree, in spite that the lithium ion rechargeable cell needs to use a liquid electrolyte, the electrolyte cannot be sufficiently injected in between the laminated film and the electrode group.

If the electrolyte is not be sufficiently injected into the cell case, this raises problems including an increase in internal resistance, and also incurs a deterioration in power generation efficiency. The technology disclosed in the above-mentioned publication interposes an elastic body in between the laminated film and the electrode group. However, the situation is still the same.

One idea for solving this problem is to lower the adhesion degree between the laminated film and the electrode group. If the adhesion degree is lowered, the cell case becomes unstable in shape. This adversely affects the packageability of the cell case into the module case, that is, the manufacture efficiency of lithium ion rechargeable cells. Furthermore, if the adhesion degree is simply reduced, gaps between the laminated film and the electrode group would be uneven, and the electrolyte cannot be uniformly injected. This causes another problem that the power generation efficiency is not successfully improved.

SUMMARY OF THE INVENTION

The invention has been made to solve the above-mentioned problems. It is an object of the invention to provide a lithium ion rechargeable cell that can be produced to have compact size and high capacity without deterioration in manufacture efficiency.

In order to achieve this object, a lithium ion rechargeable cell is constructed by the steps of forming a cell unit by packing an electrode group, in which plate-like positive and negative electrodes and a plate-like separator are superposed in layers, in a cell case and sealing the electrode group together with an electrolyte; and forming a module by aligning and packing a plurality of cell units in a module case. The cell case is made of a laminated film. A porous spacer made of insulating material is interposed in between the entire circumferential surface or partial surface of the electrode group and the laminated film.

The electrolyte is well stored in pores of the porous spacer that is made of insulating material. For this reason, in spite of high adhesion degree between the laminated film and the spacer, the electrolyte can be injected in between the laminated film and the electrode group.

It is then possible to reduce the cell case in wall thickness and smoothly pack the electrode group in the cell case without extra space. The cell case is retained in shape so as not to be deteriorated in packageability into the module case, or manufacture efficiency, and power generation efficiency is improved at the same time. In this manner, the lithium ion rechargeable cell can be produced to have compact size and high capacity.

The porous spacer is preferably made of hard material having predetermined or higher hardness.

This prevents the spacer from being deformed so that the capacity of each of the pores is undesirably changed. Consequently the electrode can be constantly well stored in the pores, and the power generation efficiency is reliably improved.

BRIEF DESCRIPTION OF THE DRAWINGS

FIG. 3 shows a part of a cross section, taken along line A-A of FIG. 1.

DETAILED DESCRIPTION OF THE INVENTION

An embodiment of the invention will be described below with reference to the attached drawings.

Figure 1:
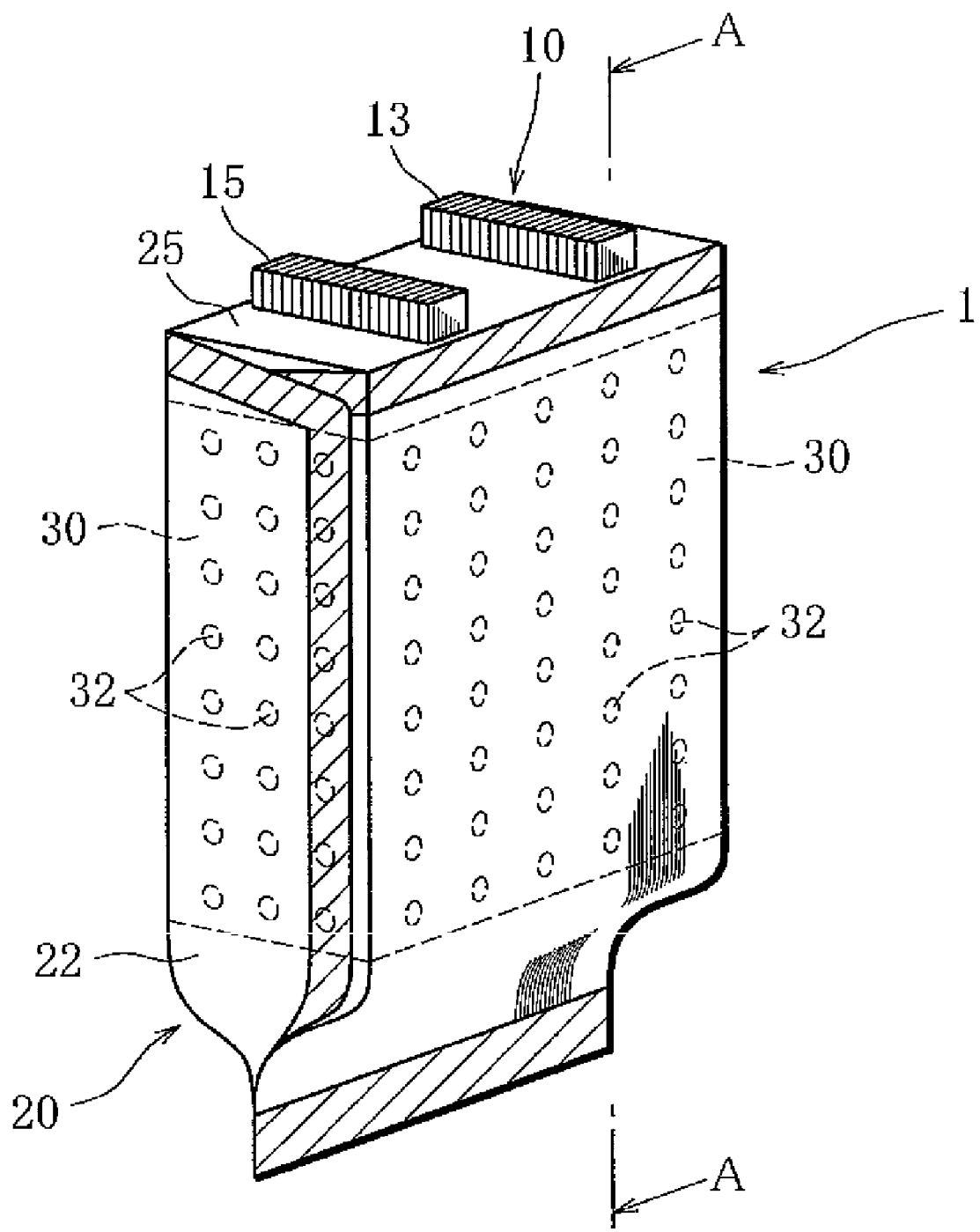
FIG. 1 is a perspective view of a cell unit of a lithium ion rechargeable cell according to the invention.
Figure 2:
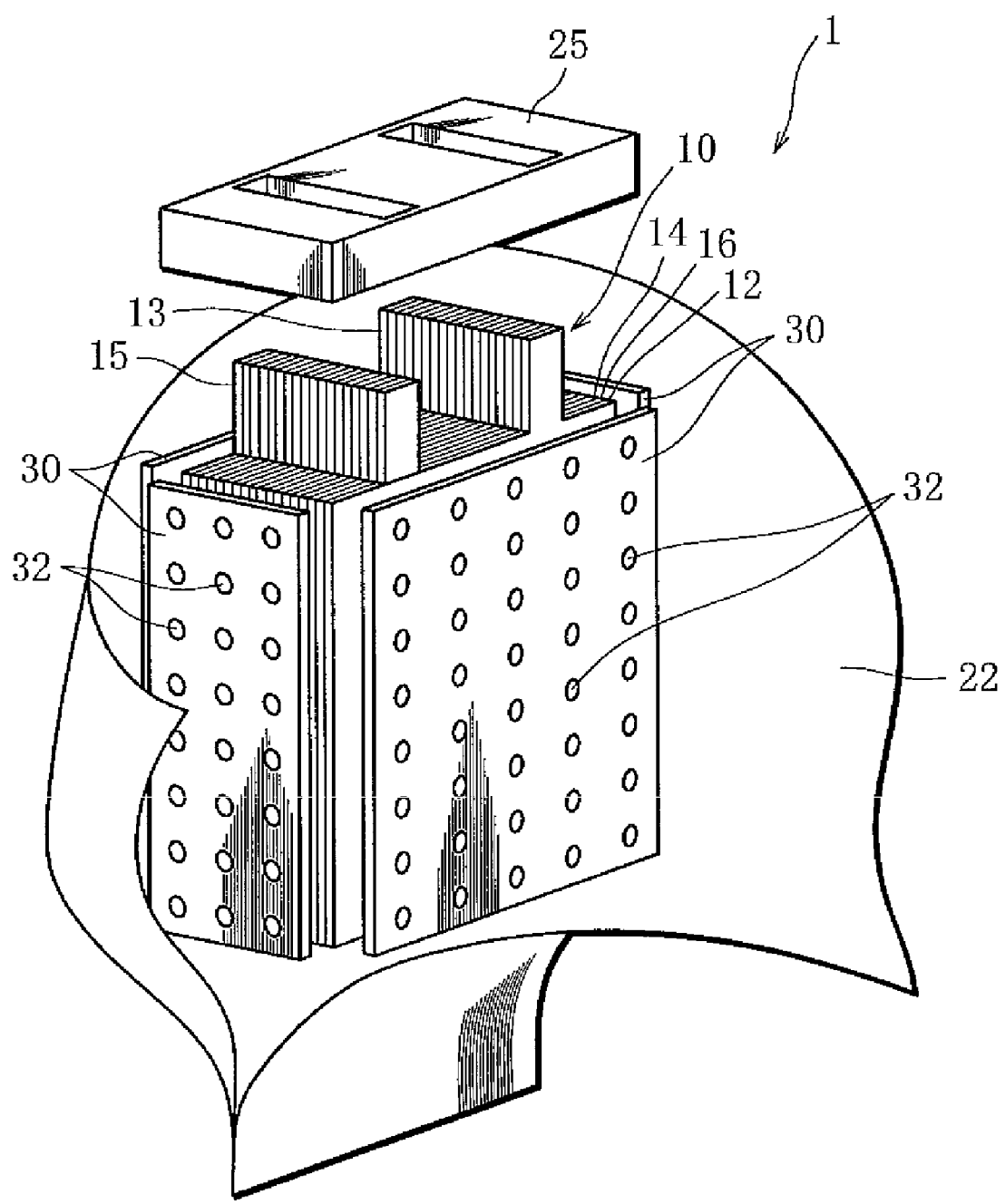
FIG. 2 is an exploded perspective view of the cell unit of the lithium ion rechargeable cell according to the invention.

FIG. 1 is a perspective view of a cell unit 1 of a lithium ion rechargeable cell according to the invention. FIG. 2 is an exploded perspective view of the cell unit 1. FIG. 3 partially shows a cross section, taken along line A-A of FIG. 1.

The cell unit 1 is one constituent unit of a lithium ion rechargeable cell that is modularized. A plurality of cell units 1 are packed in a module case, not shown, which is fabricated with a rigid case made of resin or metal, to be formed into a lithium ion rechargeable cell.

The cell unit 1 is basically formed by packing an electrode group 10, in which positive plates 12, negative plates 14, and separator plates 16 are superposed in layers, and an electrolyte into a cell case 20 made of a laminated film 22; depressurizing the electrode group 10 and the laminated film 22 so that the electrode group 10 and the laminated film 22 are firmly adhered together.

The positive plate 12 has a structure in which positive material is collected on both surfaces of a positive collector made of aluminum or the like. Materials that may be used to fabricate the positive plate 12 include, for example, lithium manganese oxide ($LiMn_2O_4$), lithium nickel oxide ($LiNiO_2$), etc.

The negative plate 14 has a structure in which negative material is collected on both surfaces of a negative collector made of copper or the like. Materials that may be used to fabricate the negative plate 14 include, for example, black lead, or more preferably an amorphous carbon-based material, etc.

The separator plate 16 insulates the positive plate 12 and the negative plate 14 from each other. The separator plate 16 may be made of, for example, polyethylene, polypropylene or the like.

The structures of the positive plate 12, the negative plate 14, and the separator plate 16 are publicly known, and the details of the structures will be omitted here.

The laminated film 22 is formed of a polymer metal composite film that is obtained by superposing, for example, thermal adhesive resin films, aluminum foil, and high-stiffness resin films in layers. It is possible to easily bond the thermal adhesive resin films together or bond the thermal adhesive resin films to other resin of the same quality by ultrasonic fusion. Accordingly, the cell case 20 that is a wrap-type pouch case can be fabricated by using the laminated film 22 without difficulty. Moreover, the electrode group 10 and the electrolyte can be easily sealed in the cell case 20.

In the lithium ion rechargeable cell of the invention, a porous spacer 30 made of insulating material is interposed in between the laminated film 22 and the entire lateral circumferential surface (partial surface) of the electrode group 10, that is, the surface of the electrode group 10 excluding upper and lower faces. In other words, the cell unit 1 is constructed by packing the electrolyte and the electrode group 10 having lateral faces covered with the porous spacer 30 into the cell case 20 made of the laminated film 22, decreasing pressure to cause the electrode group 10 or the porous spacer 30 and the laminated film 22 to firmly adhere together, and then sealing the cell case 20.

To be more concrete, as illustrated in FIG. 1, a resin cap 25 is fitted onto the top of the electrode group 10 so that a positive terminal 13 and a negative terminal 15 are protruding from the resin cap 25. The laminated film 22 is wrapped around the porous spacer 30 to be tightly attached to the porous spacer 30 with side edges adhered to each other (shown by a shaded portion). The laminated film 22 is subsequently adhered to lateral faces of the resin cap 25 at its upper edge over the whole periphery (shown by shaded portions). The laminated film 22 is closed at its lower edge with adhesive (shown by a shaded portion). In short, the laminated film 22 is tightly attached to the porous spacer 30 at the lateral surface of the electrode group 10 to form the cell case 20 that is a wrap-type pouch case.

The porous spacer 30 is made of hard material (hard resin or the like), for example, having predetermined or higher hardness. The porous spacer 30 has thickness, for example, that is equal to or less than one tenth of thickness of the electrode group 10 (when the electrode group 10 has a thickness of 10 mm, the thickness of the spacer 30 is 1 mm or less).

A large number of microscopic pores 32 are formed through the porous spacer 30. The microscopic pores 32 are capable of sufficiently holding the electrolyte inside.

Operation of the thus constructed cell unit 1 of the lithium ion rechargeable cell according to the invention will be described below.

As described above, the porous spacer 30 is interposed in between the entire lateral circumferential surface of the electrode group 10 and the laminated film 22, and the cell case 20 is thus formed. A portion of the electrolyte filled in the cell case 20 enters and stays in the microscopic pores 32 of the porous spacer 30 due to capillary phenomenon and the like.

Since the electrolyte is held in the microscopic pores 32 in this manner, the electrolyte is almost certain to be injected uniformly in between the electrode group 10 and the laminated film 22 although adhesion degree between the laminated film 22 and the spacer 30 is high as illustrated in FIG. 3, that is, the laminated film 22 is attached onto the spacer 30 with no space therebetween.

For this reason, when the cell case 20 as a wrap-type pouch case is fabricated by using the laminated film 22, it is possible to reduce the wall thickness (film thickness) of the cell case 20 and smoothly pack the electrode group 10 in the cell case 20 without extra space, and yet possible to prevent the lithium ion rechargeable cell from being increased in internal resistance and improve power generation efficiency.

Because of the high adhesion degree between the laminated film 22 and the spacer 30, the cell case 20 is prevented from being unstable in shape. As a result, there is no deterioration in packageability of the cell case 20 into the module case, or manufacture efficiency.

As stated above, according to the lithium ion rechargeable cell of the invention, it is possible to successfully achieve the compact size and high capacity of the lithium ion rechargeable cell while preventing a deterioration in manufacture efficiency and improving the power generation efficiency.

Being made of hard material, the spacer 30 is prevented from being deformed (mostly elastically). The microscopic pores 32 are therefore not undesirably changed in capacity, so that the electrolyte can be constantly well stored in the microscopic pores 32, and the power generation efficiency is surely improved.

An injection amount of the electrolyte that is injected in between the electrode group 10 and the laminated film 22 can be adjusted without difficulty by changing the number of the microscopic pores 32 (opening ratio), diameters of the microscopic pores 32 or thickness of the spacer 30.

This is the end of descriptions about the embodiment of the lithium ion rechargeable cell according to the invention, but the embodiment is not limited to the foregoing.

For instance, according to the embodiment, the porous spacer 30 is arranged only around the entire lateral circumferential surface of the electrode group 10. However, if the laminated film 22 is adhered not only to the lateral faces of the electrode group 10 but also to the upper and lower faces to form the cell case 20, it is preferable that the porous spacer 30 be arranged around the entire circumferential surface of the electrode group 10, including the upper and lower faces (avoiding the positive and negative terminals 13 and 15).

Instead of arranging the porous spacer 30 around the entire lateral circumferential surface of the electrode group 10, the porous spacer 30 may be attached only to two opposite lateral faces of the electrode group 10. This also provides sufficient advantages.

In the embodiment, the porous spacer 30 is fabricated by forming a large number of the microscopic pores 32 that are circular in section. However, the microscopic pores 32 may be formed in any shape as long as they are capable of holding the electrolyte inside. The porous spacer 30 may be made of a member having a mesh structure.

The invention claimed is:

1. A lithium ion rechargeable cell that is constructed by the steps of forming a cell unit by packing an electrode group, in which a plate-like positive electrode plate and a plate-like negative electrode plate and a plate-like separator are superposed in layers, in a cell case and sealing the electrode group together with an electrolyte; and forming a module by aligning and packing a plurality of cell units in a module case, wherein
  the cell case is made of a laminated film, and
  a porous spacer made of an insulating material is interposed in between the entire circumferential surface or partial surface of the electrode group and the laminated film, wherein
  the porous spacer is made of hard resin that is not elastically deformable, and has a large number of microscopic pores formed through the porous spacer and capable of storing the electrolyte, and wherein
  the porous spacer and the laminated film are tightly attached together.

2. The lithium ion rechargeable cell according to claim 1, wherein
  the porous spacer is made of hard resin and is equal to or less than one-tenth the thickness of the electrode group.

3. The lithium ion rechargeable cell according to claim 1, wherein
  the electrode group has an upper surface, a lower surface, and lateral surfaces that extend the upper and lower surfaces, and wherein
  the porous spacer is attached to all of the plurality of lateral surfaces.

4. The lithium ion rechargeable cell according to claim 1, further comprising:
  a resin cap fitted onto the top of the electrode group so that a positive terminal and a negative terminal are protruding from the resin cap.

5. The lithium ion rechargeable cell according to claim 4, wherein
  the laminated film is adhered to lateral faces of the resin cap at its upper edge over the whole periphery, and is closed at its lower edge with adhesive.

6. The lithium ion rechargeable cell according to claim 1, wherein
  the laminated film is wrapped around the porous spacer to be tightly attached to the porous spacer with side edges adhered to each other.

7. A lithium ion rechargeable cell comprising:
  an electrode group including a plate-like positive electrode, a plate-like negative electrode, and a plate-like separator superposed between the positive and negative electrodes;
  an electrolyte provided between the positive and negative electrodes and the separator;
  a cell case made of a laminated film that seals the electrode group together with the electrolyte; and
  a porous spacer made of an insulting material and having a plurality of pores formed through the porous spacer, the porous spacer being interposed between an entire circumferential surface or a partial surface of the electrode group and the laminated film wherein the porous spacer is made of hard resin and is equal to or less than one-tenth the thickness of the electrode group.

8. The lithium ion rechargeable cell according to claim 7, wherein
  the electrode group has an upper surface, a lower surface, and lateral surfaces that extend the upper and lower surfaces, and wherein
  the porous spacer is attached to all of the plurality of lateral surfaces.

9. The lithium ion rechargeable cell according to claim 7, further comprising:
  a resin cap fitted onto the top of the electrode group so that a positive terminal and a negative terminal are protruding from the resin cap.

10. The lithium ion rechargeable cell according to claim 9, wherein
  the laminated film is adheres to lateral faces of the resin cap at its upper edge over the whole periphery, and is closed at its lower edge with adhesive.

* * * * *

UNITED STATES PATENT AND TRADEMARK OFFICE
CERTIFICATE OF CORRECTION

PATENT NO. : 7,998,614 B2
APPLICATION NO. : 12/095708
DATED : August 16, 2011
INVENTOR(S) : Yuki Tominaga et al.

It is certified that error appears in the above-identified patent and that said Letters Patent is hereby corrected as shown below:

ON THE TITLE PAGE:

At section (75), Inventors, change:

"Yuki Tominaga, Okazaki (JP); Takaya Miyashita, Okazaki (JP)" to

--Yuki Tominaga, Okazaki (JP); Takuya Miyashita, Okazaki (JP)--.

Signed and Sealed this
Eighth Day of November, 2011

David J. Kappos
*Director of the United States Patent and Trademark Office*